Aug. 27, 1935.   S. SEWALL   2,012,591
CONSTRUCTION OF MOTOR VEHICLE BODIES AND OTHER STRUCTURES
Filed Jan. 24, 1933   2 Sheets-Sheet 2
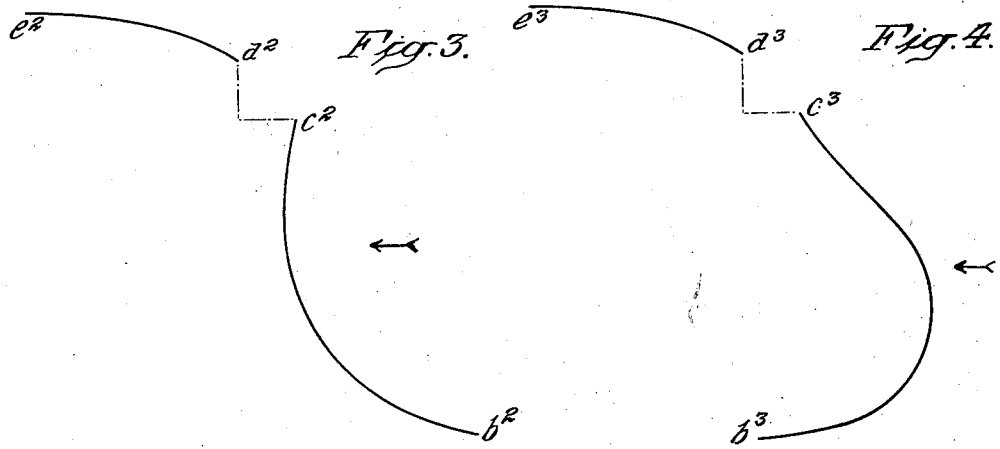
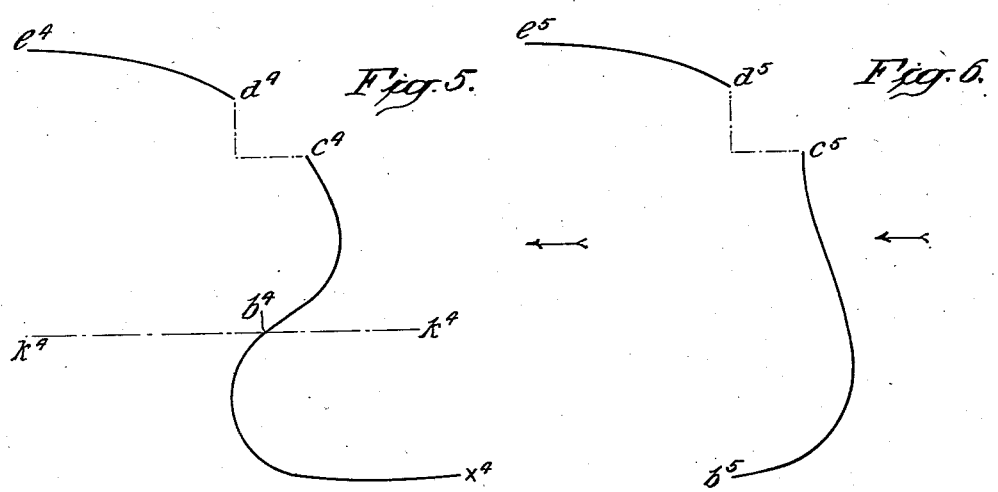
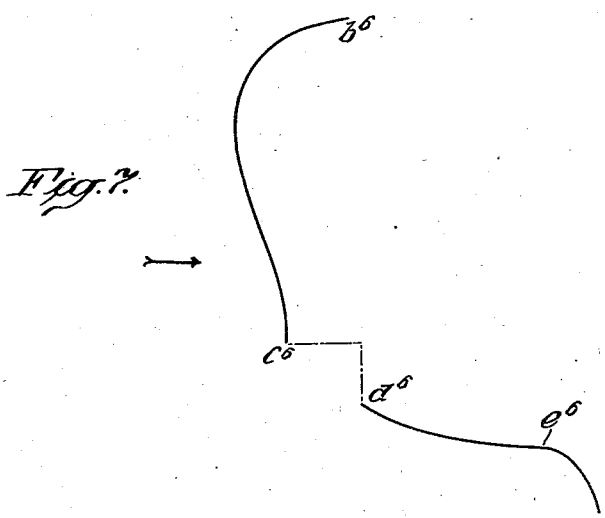
INVENTOR
SUMNER SEWALL
BY
E. C. Sanborn
ATTORNEY Patented Aug. 27, 1935

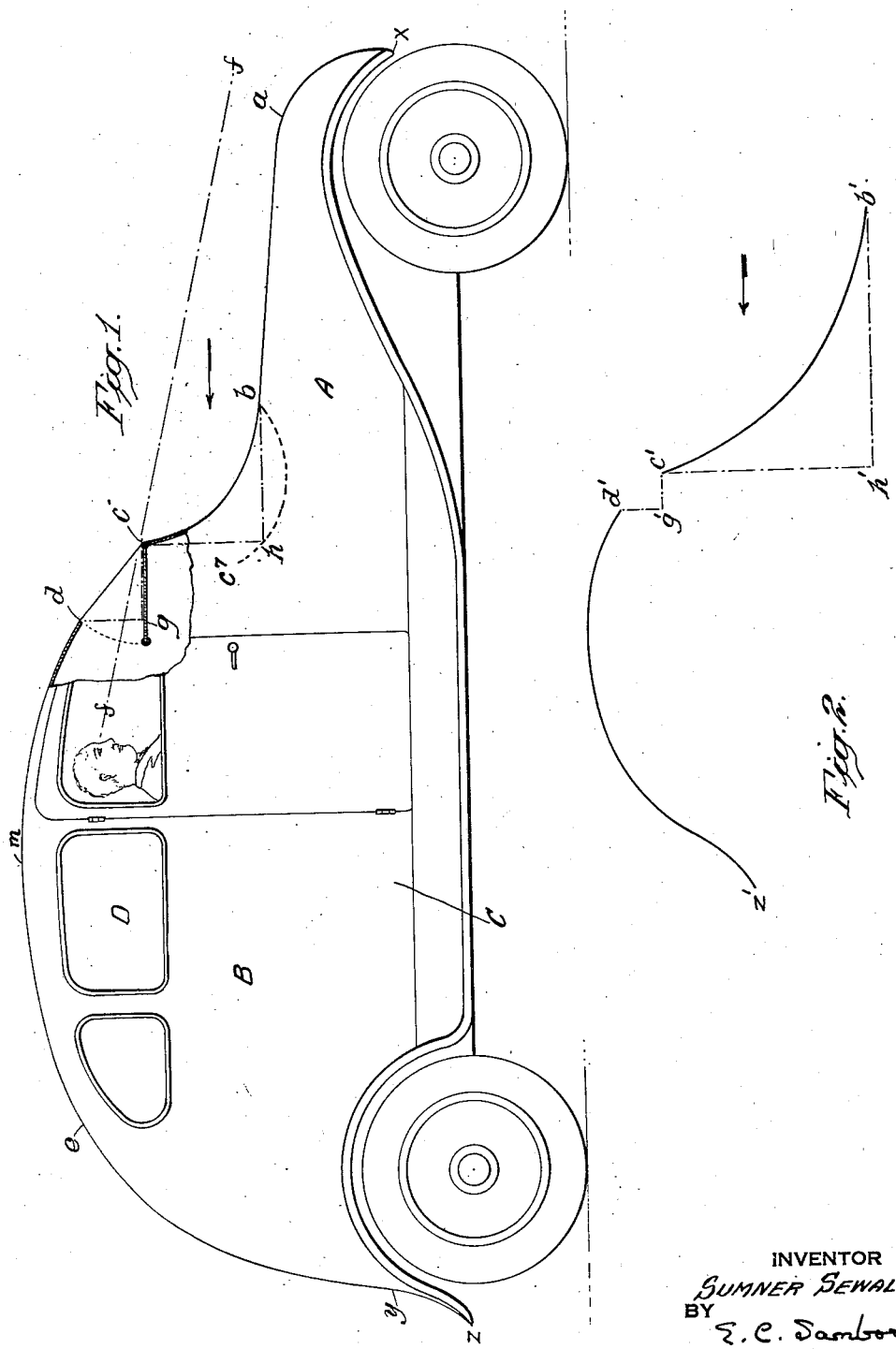

2,012,591

UNITED STATES PATENT OFFICE 2,012,591

CONSTRUCTION OF MOTOR VEHICLE BODIES AND OTHER STRUCTURES

Sumner Sewall, Bath, Maine

Application January 24, 1933, Serial No. 653,223

19 Claims. (Cl. 296—91)

This invention relates to a novel and improved aerodynamic body including a combination of airfoil surfaces against which a current of air may blow or be caused to blow.

The present invention involves the application of certain aerodynamic principles on the one hand, and the development of a construction which, on the other hand, appears to produce extraordinary results. In accordance with the present invention, there is provided a construction including cooperating surfaces between the edges of two of which an aperture is formed, the construction of these surfaces being such that air may impinge upon one of them, and such that the other of them cooperates with the first to prevent substantial flow of air through the opening. More particularly, this construction, incorporated in a body or compartment which persons may occupy, provides a clear opening to the exterior without permitting a direct blast of air to blow through the opening.

Another important feature of my invention lies in its ability to control the direction and rate of flow through the aperture.

My improved construction is useful in a number of different situations one of which is in vehicles, such as, for example, automobiles, boats, trains and aeroplanes where the driver or operator desires a clear vision ahead without the disadvantage of a blast of air in his face. My invention has been developed particularly in connection with automobiles, the disadvantages of a windshield being generally in large part avoided through my construction. That is to say, dirt, effects of fog, and the glare, upon the windshield, of the sun and headlights of cars behind or going in the opposite direction, as well as the danger of broken glass in accidents, may be eliminated by reducing the need for a windshield, and at the same time, drafts upon those in the car may be avoided, while the persons in the car may enjoy the sensation of being right out in the open. Similarly, in airplanes the pilot will be enabled to have better visibility while being out of the slipstream. So in railway cars, steam engines, busses, boats and other vehicles.

My invention is also useful for buildings or any structures in which it is desired to provide for such control of air.

Other objects and advantages of my invention will become apparent in connection with the following detailed description of an illustrative embodiment of the invention, reference being had to the accompanying drawings, wherein:

Fig. 1 is a side elevation, partly broken away, of an automobile constructed in accordance with the invention.

Fig. 2 is a diagrammatic side elevation showing a modified form of surfaces with an aperture therebetween according to the invention.

Figs. 3-7 are views, similar to Fig. 2, of other modifications of the invention.

Referring to Fig. 1, there is shown diagrammatically an automobile having a hood portion A and a body portion B. The hood A may enclose the engine and may be considerably lower than usual as shown by the line $a$—$b$. This may ordinarily be accomplished without altering the position of the engine below the hood as there is generally space to spare above the engine. The portion $a$—$b$ of the hood preferably lies generally horizontal (lengthwise of the car) and below the level of the point $b$. However, the portion $a$—$b$ is not essential to the proper functioning of my invention. Between the points $b$ and $c$ indicated at the rear of the portion $a$—$b$ is a surface which may take the place of all or a portion of the cowl on the usual automobile, and which is preferably concave on the face upon which the air impinges, or in other words, toward the front of the car, and which may be smoothly curved. The surface $b$—$c$ may advantageously be horizontal from side to side. The configuration of this surface in any vertical plane lengthwise of the car is advantageously such that its angle to the horizontal increases slowly at first, starting at the point $b$, and gradually increases so that the curve takes a form which may be generally described as one branch of a parabola, the angle to the horizontal increasing relatively sharply toward the top or trailing edge $c$ of the curved portion $b$—$c$, the edge $c$ being located approximately at the vertex of the parabola. Advantageously, the point $b$ is well in advance of point $c$. The ordinate $h$—$c$ of the effective portion of the curve is preferably about three-quarters or more of the abscissa $h$—$b$. As plotted in Fig. 1, the ratio of ordinate to abscissa may advantageously be about .85 to 1.

From a point $d$, above and to the rear of point $c$, there extends a single surface $d$—$e$ which constitutes the top of the car, is preferably convex outwardly, and cooperates with the surface $b$—$c$ to produce the desired result. The edges $c$ and $d$ are preferably parallel. The surfaces $b$—$c$ and $d$—$e$ which include the edges $c$ and $d$ may advantageously extend straight across the car body or any portion of the width thereof. Good results may be secured where the surface $d$—$e$ or at least the forward portion thereof $d$—$m$ follows a suitable curve similar to the upper surface of an airplane wing. The curve $d$—$e$ shown is suitable with the curve $b$—$c$, but the chord and amount of upper camber may vary, particularly for other forms of $b$—$c$.

Between the leading edge of the surface $d$—$e$ and the trailing edge of the surface $b$—$c$ there is preferably provided a clear opening $c$—$d$ of such size that sufficient visibility is provided. Good results may be obtained in such construction where the clear height of the opening $g$—$d$ is about one-half or less of the ordinate $h$—$c$ of the curve $b$—$c$. In this type of construction the edge $d$ may lie about the same distance rearwardly of the edge $c$ as above this edge, as shown by the dot and dash lines $g$—$c$ and $g$—$d$, although this ratio may vary with the shapes and extents of the surfaces $b$—$c$ and $d$—$e$.

Excellent results may be achieved with my construction where the body B of the car is substantially closed except for the opening $c$—$d$. That is to say, the body may have sides C which extend generally parallel, and lengthwise of the car to join the cowl $b$—$c$ and top $d$—$e$. Good results may also be secured where the sides of the car are open. The usual floor may be employed in the body. When the car is closed the outer surfaces of the sides B may take suitable shapes provided they do not produce inordinate flow of air which might interfere with the functioning of the surfaces $b$—$c$ and $d$—$m$ for present purposes. For example, it is desirable that the sides C, which may be spaced the full width sweep smoothly back from the side edges of the surface $b$—$c$. The sides C may take a somewhat stream-line form, if desired, although the present general lines of car body design may ordinarily be satisfactory.

While the front end of the hood may advantageously curve off as at $a$—$x$, and the rear of the body may follow smooth stream-line curves as at $e$—$y$—$z$, I do not deem these portions essential to the satisfactory operation of the principal features of the invention.

It will be understood that the driver's seat should be high enough and near enough to the opening $c$—$d$ so that his line of vision $f$—$f$ will permit the desired visibility. As the air stream does not enter the car to any substantial extent beyond the straight line joining $c$—$d$, the driver may be placed closer to the aperture than shown, thus increasing his view of the front of the car and the road without danger that he will be placed in a draft.

In order to provide a closure for the opening $c$—$d$ in case of rain, a glass windshield E may be pivoted at the edge $c$ of the cowl $b$—$c$ or otherwise supported for opening and closing as desired. The windshield might be supported for sliding to cover all or any part of the opening, if desired. No details of construction of this feature or of other portions of the body are set forth because such will be apparent to those skilled in the art, as will the fabrication of the construction from suitable materials.

The principle upon which my invention is based is that air tends to flow from an area of high pressure to an area of low pressure. I have provided a surface against which air may impinge and which deflects the air, and builds up a high pressure area, and a surface adapted to catch the air before it eddies into the opening between the surfaces, and to develop an area of negative or relatively low pressure and guide the air to a point rearward of the opening. In this manner, a relatively low pressure is developed in the air flowing past the opening, as compared to the relatively high pressure area in front of the surface $b$—$c$, and the air is prevented from flowing in through the opening, probably due in part to the pressure of the air inside the opening and in part to the velocity and direction of the air flowing past the opening. In other words, the acceleration of the air flowing from the pressure area in front of the surface $b$—$c$ and past the opening $c$—$d$ tends to build up an area of reduced pressure above the surface $d$—$m$, and the air flowing directly toward and in line with the face of the opening may be prevented from flowing into the opening by reason of the fact that the pressure above the surface $d$—$m$ is less than the pressure within the opening.

When the body of the car is closed so that a compartment is formed within the body, the direction and rate of flow of air through the aperture may be controlled either by varying the pressure conditions inside the car or by varying the air forces acting outside the opening. In the construction shown in Fig. 1, when the windows D of the car are closed air does not flow into the compartment through the aperture $c$—$d$. If a window D rearward of the aperture $c$—$d$ is opened on the side of car where air may blow into the body through the window, this will tend to cause air to flow out through aperture $c$—$d$, and if a window is opened on a side where air will tend to flow out through the window, this acts to cause air to flow in through the aperture $c$—$d$. If a portion of the surface $e$—$y$ at the rear of the car is opened where air is blowing in the direction of the arrow, the tendency may be to cause air to flow inwardly through aperture $c$—$d$ on account of the reduction of the pressure within the body.

When the body of the car is either open or closed, the inflow or outflow of the air through opening $c$—$d$ may be varied by controlling air forces acting from outside the car. As indicated, the construction illustrated is advantageous where it is desired that no substantial air shall flow through the opening into the car (although there may be some slight eddying or bend of the air stream close to the side edges and face of the opening). I have found that the relation of the surface $b$—$c$ to the surface $d$—$e$, and more particularly, that the relation of the edge $c$ to the edge $d$, are important factors for present purposes. Moreover, the system described, in which an equilibrium may be said to exist between the air just at either side of the opening, may be readily balanced and unbalanced, to cause air to flow either in or out through the opening $c$—$d$.

The system appears to be rather delicately balanced for a given set of surfaces $b$—$c$ and $d$—$e$, and it may also be mentioned that the openings shown are probably maximum for the given curves, to prevent the air from flowing in through the opening, turbulently or otherwise. While the sizes of the openings shown may be reduced, they probably cannot be much enlarged, in proportion to the given curves, without permitting the entrance of much air through the openings by destroying the air seal which is generally desired across the face of the opening. For any given set of curves, the proper location of the edge $d$ with respect to edge $c$, to prevent inflow of air, may be readily ascertained in accordance with the invention, and by varying various relationships, inflow or outflow may be produced. While I do not believe it is practicable or possible to point out concisely every possible variation of the construction and relation of the surfaces $b$—$c$ and $d$—$e$, and while I beileve that from the foregoing the proper adjustments can be made by those skilled in the art, I shall suggest certain possibilities along these lines.

In general, it may be said that for given curves $b$—$c$ and $d$—$e$, the size and location of the opening $c$—$d$ are important. With the surfaces and opening shown the tendency will be to prevent flow of air in either direction through the aperture. It will be understood that in these constructions where the air is blowing in the direction of the arrow, there will be a positive pressure upon the surface $b$—$c$ while a negative pressure will be developed on the upper surface $d$—$e$, at least over the forward end thereof. By having the opening $c$—$d$ nearer the area of maximum negative pressure, which is on top of the curve $d$—$e$ the tendency to draw air out through the opening may be increased, while by positioning it nearer to the area of positive pressure, which is below the edge $c$, the air may be caused to flow inwardly through the opening, if desired. Similar results may be achieved by varying the steepness of the curve $b$—$c$. That is to say, if the position of the trailing edge $c$ is maintained and if the curve $b$—$c$ is flatter, the tendency for air to enter the opening $c$—$d$ may be increased, while by making the curve $b$—$c$ steeper, especially at its upper portion, the opposite tendency may be produced. Similarly, by lowering the surface $d$—$e$ and the edge $d$ the construction will tend to draw the air out to a greater extent while by raising the edge $d$ the air will be more apt to flow inwardly through the opening. Within the hereinafter indicated limits of the size of the opening for given curves, it appears that the further the surface $d$—$e$ and the edge $d$ lie horizontally rearward of the edge $c$ the more is the tendency to produce suction out through the opening, while as the surface $d$—$e$ and the edge $d$ approach the edge $c$ horizontally, the tendency is to permit air to blow in.

Furthermore, I believe that by tipping the curved surface $b$—$c$ about a fixed point, for instance, $b$, in a clockwise direction, the air seal may be broken, and that similar results may be produced by tipping the curve counter-clockwise, for example as shown diagrammatically by dotted line $b^7$—$c^7$, Fig. 1, through rather small angles. Similarly by tipping this curved surface sufficiently about point $c$ similar results may be secured. Where desired, the surface $b$—$c$ may be pivoted for this purpose, or the surface $d$—$e$ or part of it may be pivoted, to permit breaking the air seal at will.

While I do not wish to be limited to any particular theory of operation, it appears to be the fact that with the edge $c$ located, the edge $d$ must be located to catch air flowing past the edge $c$ before it eddies to effect the desired air seal across the opening, while if the edge $d$ extends forward of the eddy or "burble" point the air will rush inwardly through the opening. The "burble" point will vary with each particular curve $b$—$c$, and may be readily determined in each case.

My present construction appears to be self-adjusting for different speeds of the vehicle in which it is employed, and I believe that under most if not all conditions under which a vehicle may be normally operated, the effect of a given construction in accordance with the invention may be controlled as indicated herein.

In Fig. 2 there is shown at $b'$—$c'$—$d'$—$z'$ a modified form of curve for general use where there is room to extend the curve $b'$—$c'$ downward as shown. It will be understood that by constructing the curves, for instance, so that they take the form shown in this figure, and by controlling the size or location, or both, of the aperture, the relative forces controlling the flow of air from the interior of the opening may be varied. This opening is at least mainly located in the area of negative or low pressure rearward of the trailing edge of the curve $b'$—$c'$, for preventing inflow of air through the opening. The location of the opening may be varied somewhat within readily ascertainable limits for given curves. The edge $d'$ should not be forward of the vertical plane of the edge $c'$ and its distance to the rear of the latter is an important factor. As shown in this figure the ratio of the ordinate $h'$—$c'$ to the abscissa $h'$—$b'$ may be about .8 to 1, while the edge $d'$ may lie rearward and above the edge $c'$, as indicated by the dot and dash lines $g'$—$c'$ and $g'$—$d'$. The ratio of the ordinate $g'$—$d'$ to the ordinate $h'$—$c'$ may be about one to four for the curves shown to produce good results in preventing the air stream from flowing in through the opening to the desired extent.

In Figs. 3 to 7 there are shown other examples of constructions in accordance with my invention. The tests which I have made upon these constructions have seemed to indicate that they function more or less effectively as compared to the surfaces shown in Figs. 1 and 2. However, these constructions as shown in Figs. 3 to 7 are presented merely for the purpose of illustrating some of the many ways in which my construction may be varied while still employing the invention.

In Fig. 3 there is shown a construction including surfaces $b^2$—$c^2$ and $d^2$—$e^2$. It will be noted that the upper portion of the former surface inclines slightly forwardly at its upper end. I do not regard this as advantageous in most cases as it appears to somewhat limit the size of the opening as compared to the length of the forward curve. Still, it is submitted as another example of a construction in which an air seal may be produced across an opening toward the face of which air is blowing.

In Fig. 4 the construction shown comprises curved surfaces $b^3$—$c^3$ and $d^3$—$e^3$. In this construction, it will be noted that the lower portion of the curve $b^3$—$c^3$ is convex to the air stream and oppositely curved to the upper portion of the surface.

In Fig. 5 the construction is shown comprising curved surface $b^4$—$c^4$, and $d^4$—$e^4$, the curve $b^4$—$c^4$ simulating to some extent the curve $b^3$—$c^3$. In this figure the line $k^4$—$k^4$ may represent either the ground level or the lower edge of the construction and indicates generally the desired extent of the leading surface $b^4$—$c^4$. However, similar results with respect to the opening $b^4$—$c^4$ may be achieved if the curve be extended as at $b^4$—$x^4$ for any desired purpose.

Fig. 6 shows a construction including surfaces $b^5$—$c^5$ and $d^5$—$e^5$ somewhat similar to the construction shown in Fig. 4 and useful, for instance, for an automobile in which the engine is mounted at the rear of the machine.

In Fig. 7 there is shown a construction including surfaces $b^6$—$c^6$ and $d^6$—$e^6$ which may be employed where the construction is reversed, for instance, in a building having an overhanging upper portion and where it is desired to have an aperture $c^6$—$d^6$ for purposes indicated.

While the construction is illustrated in connection with an automobile, where it is desirable that the edges c and d extend generally parallel to the ground (although they may be curved along their length, if desired) it will be understood that the edges c and d may extend generally at other suitable angles, for instance, substantially vertical, the surfaces b—c and d—e then taking corresponding, relative positions with respect to the edges. For example, such an arrangement of my invention may well be advantageous in an airplane at the forward end of the pilot's cockpit. In building constructions, it may be advantageous to have the curve b—c lie above the curve d—e, so that the construction shown in Figs. 1 and 2 is generally reversed or turned upside down.

In describing the invention I have set forth certain theories of air flow which I believe to be sound, but if later developments should prove them to be in error, the invention does not need to be restricted by these theories because the specification otherwise fully discloses the character of my constructions which will produce the desired results.

While my invention has been described in connection with buildings and vehicles, it will be understood that it may also be employed for any other purpose where it is desired to control the flow of air as pointed out.

While the invention has been developed in connection with a situation where the driver or operator desires the clear vision without the disadvantage of a blast of air in his face, it will be appreciated that the invention is equally applicable to a passenger or other person riding in the vehicle, and where the term operator is employed it intends any such person.

It may be possible to increase the efficiency of my construction by providing members which cooperate with my airfoil in a manner similar to the well-known Handley-Page wing slots, but I do not deem such essential.

Where the term "airfoil" is used it is not employed in any strict academic sense, but denotes any surface designed to react with air impinging thereon, whether the surface is moving or stationary.

It will be appreciated that where reference is made to the leading and trailing edges, the actual surfaces may extend beyond these edges so long as they do not extend into the air stream so as to interfere with the desired flow. For instance, in Crowell Patent 1,361,231, there is shown in Fig. 4 a gutter on the inside of the construction. Hence when we refer to the trailing edge and the lower surface, the intention is not to refer to something which is rearward of the line joining the edges of the opening.

When the terms "concave" or "convex" surface are used, they mean concave or convex, respectively, to the direction of the air stream impinging upon or reacting with the surface.

Consonant with the foregoing, it will be understood that both the shape and the general inclination of the upper surface may vary, but that preferably this portion of the construction lies generally in a direction more horizontal than vertical, or in other words in line with the direction of the main body of the air stream than across the same, and that this surface is arranged to assist the flow of air thereover, or in other words, to avoid banking up of air with resultant spill through the aperture. Advantageously the upper surface extends upwardly and rearwardly, for instance as shown in the drawings, in order to aid in causing acceleration of the air stream flowing over the upper surface.

The terms and expressions which have been employed are used as terms of description and not of limitation, and there is no intention, in the use of such terms and expressions, of excluding any equivalents of the features shown and described, or portions thereof, but it is recognized that various modifications are possible within the scope of the invention claimed.

I claim:

1. In a vehicle under the control of an operator, a transverse cowl portion having an upper, trailing edge, substantially below the level of the eyes of the operator, said portion extending downwardly for a substantial distance, a top portion having a leading edge upwardly and rearwardly of the first named edge and above the level of the eyes of the operator, said top portion being convex on its upper side adjacent said leading edge, and said edges forming an aperture therebetween sufficient to provide visibility under operating conditions, and said second named portion being free of obstructions to the flow of air and being constructed and arranged with respect to the first named portion to catch air flowing past the first named edge in advance of its burble point, and to carry air over the top of the vehicle, and to develop a relatively low pressure adjacent its leading edge, whereby a stream of air is prevented from entering said aperture.

2. In a vehicle under the control of an operator, a transverse cowl portion having an upper, trailing edge, substantially below the level of the eyes of the operator, said portion extending downwardly for a substantial distance and lying substantially, entirely, forwardly of a vertical plane through said edge, a top portion having a leading edge upwardly and rearwardly of the first named edge, and above the level of the eyes of the operator, said top portion having a convexly curved upper surface, and said edges forming an aperture therebetween sufficient to provide visibility under operating conditions, and said second named portion being free of obstructions to the flow of air and being constructed and arranged with respect to the first named portion, to catch air flowing past the first named edge in advance of its burble point, and to carry air over the top of the vehicle, and to develop a relatively low pressure adjacent its leading edge, whereby a stream of air is prevented from entering said aperture.

3. The construction as claimed in claim 1, wherein said vehicle comprises a body adapted normally to be closed and including means in at least one of its walls adapted to be opened and closed to control the flow of air through the aperture.

4. The construction as claimed in claim 1, wherein the second-named portion extends in the general configuration of an airplane wing from its forward edge to the rear of the vehicle and to a level below the level of the aperture.

5. The construction as claimed in claim 1 wherein the first-named portion extends as a smooth curve lying substantially entirely forwardly of a vertical plane through its trailing edge.

6. In a construction of the character described, a portion having a surface extending transversely to an air stream and an upper, trailing edge, said portion extending downwardly from said edge for a substantial distance and in such configuration as to deflect air striking the surface into a path across the air stream, and a portion having a leading edge upwardly and rearwardly of the first-named edge, said edges forming an aperture therebetween and the forward part of said second-named portion being substantially like the upper surface of the front of a cambered airplane wing and being constructed and arranged, with respect to the first-named portion, to catch air flowing past the first-named edge in advance of its burble point and carry said air over the top of the second-named portion, and to develop a relatively low pressure above its forward part, whereby a stream of air may be prevented from entering the aperture.

7. In a vehicle, a construction of the character described comprising a portion having a surface extending transversely to an air stream and an upper, substantially horizontal trailing edge, said portion extending downwardly from said edge for a substantial distance and in such configuration as to deflect air striking the surface into a path across the air stream, and a portion having a leading edge spaced upwardly and rearwardly from the first-named edge and substantially parallel thereto, said edges forming an aperture therebetween, and the upper surface of said second-named portion curving upwardly from its leading edge to a high point, and then curving downwardly, the vertical height of the aperture being greater than the height of said high point above said leading edge, and the forward part of said second-named portion being free of obstructions to the flow of air and being constructed and arranged, with respect to the first-named portion, to catch air flowing past the first-named edge in advance of its burble point and pass said air over the top of the second-named portion, and to develop a relatively low pressure above its forward part, whereby a stream of air may be prevented from entering the aperture.

8. In a vehicle under the control of an operator, a transverse cowl portion having an upper, trailing edge, substantially below the level of the eyes of the operator, said portion extending downwardly for a substantial distance, a top portion having a leading edge upwardly and rearwardly of the first named edge and above the level of the eyes of the operator, said top portion being convex on its upper side adjacent said leading edge, and said edges forming an aperture therebetween, having a vertical height substantially equal to that of a man's head and sufficient to provide visibility under operating conditions, and said second named portion being free of obstructions to the flow of air and being constructed and arranged with respect to the first named portion to catch air flowing past the first named edge in advance of its burble point, and to carry air over the top of the vehicle, and to develop a relatively low pressure above its forward position, whereby a stream of air is prevented from entering said aperture.

9. In a windshield construction for vehicles, for preventing an air stream directed toward an opening from entering the same, a lower surface having a rearward, upper edge and extending downwardly and forwardly therefrom for deflecting a part of the air stream in a generally stream-line path and into a direction across the opening, and an upper surface having a forward edge above and spaced from said upper edge, to form an opening between said edges, said forward edge being so positioned with respect to said rearward edge as to enable said deflected air to substantially all pass above said forward edge, said second surface extending upwardly and rearwardly from its forward edge in a general direction which is at a small angle to the horizontal, and being free of obstructions to the flow of air thereover.

10. The construction as claimed in claim 9, wherein the free height of the opening is approximately half the effective height of the lower surface.

11. The construction as claimed in claim 9, wherein said forward edge lies substantially rearwardly of said upper edge.

12. The construction as claimed in claim 9, wherein said upper surface bulges above said forward edge, whereby the flow of air is accelerated and a negative pressure is developed adjacent said leading edge as compared to the pressure rearward of the aperture.

13. The construction as claimed in claim 9, wherein at least one of said portions is adjustable to vary the flow or air through the opening.

14. In a vehicle under the control of an operator, a transverse solid portion having an upper, trailing edge, below the level of the eyes of the operator, said portion extending downwardly and forwardly for a substantial distance and being adapted to deflect an air stream striking it into a path generally across the air stream, whereby a relatively high pressure is produced adjacent said trailing edge, a top portion having a leading edge spaced upwardly and rearwardly from the first-named edge, said top portion lying more in a horizontal than vertical direction, whereby to assist the passage of air thereover, extending in such configuration as to produce a negative pressure adjacent its leading edge and being free of obstructions to the flow of air thereover, and said leading edge being arranged with respect to the first-named portion to catch air flowing past the first-named edge at a point where its velocity is sufficient to carry it over said leading edge, whereby a stream of air is prevented from entering said aperture.

15. In a vehicle under the control of an operator, a construction for enabling the operator to enjoy clear vision through an opening facing toward the front of the vehicle, while preventing an air stream from entering the opening, a surface having an upper, trailing edge and extending downwardly and forwardly in such configuration as to bend a portion of said stream into a direction substantially across the opening in a smooth, stream-line flow, and a single upper surface having a leading edge spaced above and rearward of said trailing edge a distance sufficient to provide an opening for requisite visibility under operating conditions, and close enough to catch said deflected air before it breaks into the opening, said upper surface extending rearwardly from said leading edge to a point above the same and extending more in a horizontal than in a vertical direction, whereby the air stream is prevented from entering said opening.

16. The construction as claimed in claim 15 wherein the free height of the opening is approximately half the effective height of the lower surface.

17. In a vehicle under the control of an operator, a transverse solid portion having an upper trailing edge below the level of the eyes of the operator, a transverse solid portion having a leading edge upwardly and rearwardly of the first-named edge, said edges forming an aperture therebetween sufficient to provide visibility under operating conditions, and said first-named portion extending downwardly from said trailing edge and being adapted to deflect an air stream striking it in a smooth, stream-line path generally across the direction of the air stream, whereby a relatively high pressure is produced adjacent said trailing edge as compared to the pressure rearward of a line joining said edges, and said second-named portion being free of obstructions to the flow of air thereover, extending in a direction more horizontal than vertical, and being constructed and arranged to produce a relatively low pressure area adjacent its leading edge as compared to the pressure rearward of a line joining said edges, the gap across said aperture being of such dimensions that the velocity or momentum of the air is sufficient to bridge it, and said upper surface being of such configuration and arrangement as to assist said air to pass over the top of the vehicle, whereby a stream of air is prevented from entering said aperture.

18. In a windshield construction of the character described, a portion having a surface extending transversely to an air stream and an upper, trailing edge, said portion extending downwardly from said edge for a substantial distance and in such configuration as to deflect air striking the surface into a path across the air stream, and a portion having a leading edge upwardly and rearwardly of the first-named edge, said edges forming an aperture therebetween, and said second-named portion extending in a direction more toward the horizontal than the vertical and being free of obstructions to the flow of air thereover, said second-named portion being constructed and arranged, with respect to the first-named portion to catch air flowing past the first named edge in advance of the point where it breaks into the opening and to carry said air over its upper side and to develop a relatively low pressure adjacent its forward path, whereby a stream of air may be prevented from entering the aperture.

19. The construction as claimed in claim 18 wherein at least one of said portions is adjustable for controlling the flow of air through the aperture.

SUMNER SEWALL.